United States Patent
Xiao

(10) Patent No.: US 8,473,730 B2
(45) Date of Patent: Jun. 25, 2013

(54) COMPUTER WITH NETWORK DETECTING MODULE AND METHOD FOR CONTROLLING COMPUTER WHEN DETECTING NETWORK CONNECTION

(75) Inventor: Zong-Bao Xiao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 537 days.

(21) Appl. No.: 12/753,302

(22) Filed: Apr. 2, 2010

(65) Prior Publication Data

US 2011/0173425 A1    Jul. 14, 2011

(30) Foreign Application Priority Data

Jan. 14, 2010   (CN) .......................... 2010 1 0300315

(51) Int. Cl.
*G06F 15/177*    (2006.01)
(52) U.S. Cl.
USPC .................................. 713/2; 713/1; 713/183

(58) Field of Classification Search
USPC .................................................. 713/1, 2, 183
See application file for complete search history.

(56) References Cited

U.S. PATENT DOCUMENTS

| | | | |
|---|---|---|---|
| 6,957,286 B1* | 10/2005 | Cohen | 710/38 |
| 7,710,587 B2* | 5/2010 | Crosier et al. | 358/1.15 |
| 2004/0008633 A1* | 1/2004 | Youn | 370/254 |
| 2006/0075124 A1* | 4/2006 | Dougherty et al. | 709/228 |
| 2006/0235959 A1* | 10/2006 | Hashi | 709/224 |
| 2007/0250910 A1* | 10/2007 | Miller et al. | 726/4 |
| 2008/0247730 A1* | 10/2008 | Barton et al. | 386/83 |
| 2009/0217379 A1* | 8/2009 | Chang et al. | 726/24 |
| 2010/0095366 A1* | 4/2010 | Baker | 726/11 |

* cited by examiner

Primary Examiner — Jaweed A Abbaszadeh
(74) Attorney, Agent, or Firm — Altis Law Group, Inc.

(57) ABSTRACT

A computer includes a control module and a basic input and output system (BIOS) storage module. The BIOS storage module stores BIOS programs. The BIOS storage module includes a detection sub-module and a switch sub-module. The detection sub-module is capable of detecting a network connection state. The switch sub-module is capable of controlling an on-off state of the detection sub-module. The control module is capable of executing a control operation to restrict a system function when a connected network state is detected by the detection module.

6 Claims, 3 Drawing Sheets

COMPUTER WITH NETWORK DETECTING MODULE AND METHOD FOR CONTROLLING COMPUTER WHEN DETECTING NETWORK CONNECTION

BACKGROUND

1. Technical Field

The present disclosure relates to computers and methods for managing computers, especially to a computer with network connection detecting function and a method for controlling network connections.

2. Description of Related Art

The Internet is widely used. People play Internet games or chat on the Internet. However, some children play the Internet games or chat online, which may not be desirable. Typically, in order to restrict usage of the computer, their parents may install a computer or a network management program in the operation system to restrict network access. However, this kind of program can be cracked by some children.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or Assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
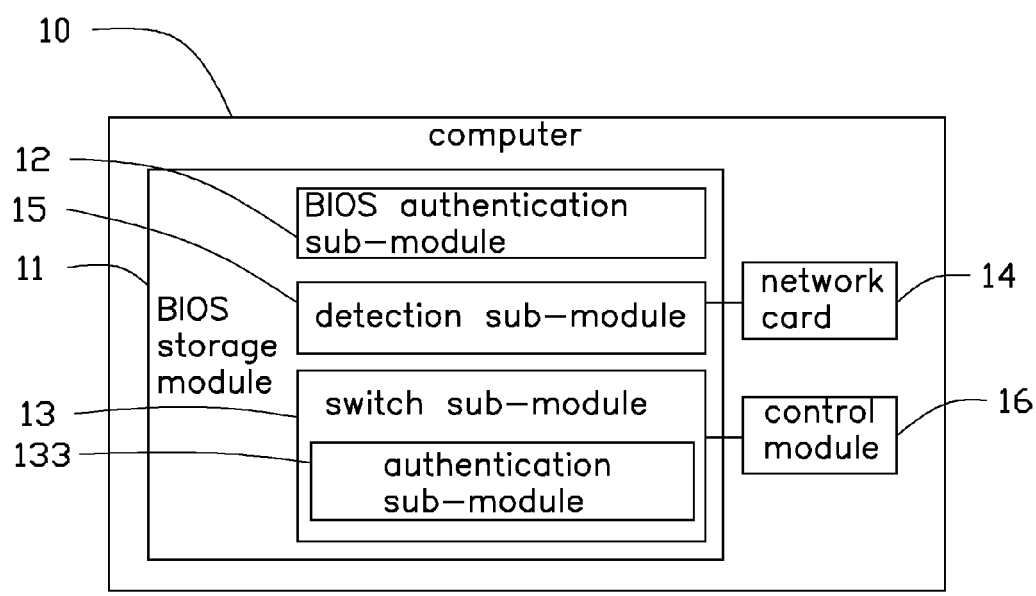
FIG. 1 is a block diagram of a computer in accordance with an embodiment.

FIG. 1 illustrates a computer 10, in accordance with an embodiment, that includes a basic input and output system (BIOS) storage module 11, a control module 16, and a network card 14.

The BIOS storage module 11 may be one of a read-only memory, an electrically erasable programmable read-only memory, and a flash memory. The BIOS storage module 11 includes a BIOS authentication sub-module 12, a detection sub-module 15 for detecting a network connection, and a switch sub-module 13. The BIOS authentication sub-module 12 can approve access to amend the BIOS storage module. The detection sub-module 15 is connected to the network card 14. The detection sub-module 15 may detect a network connection state through a physical connection of a network connector of the network card 14. The switch sub-module 13 is connected to the detection sub-module 15. The switch sub-module 13 can control an on-off state of the detection sub-module 15. The switch sub-module 13 includes an authentication sub-module 133. The authentication sub-module 133 may include authentication function relating to approving that a person has certain access rights through, e.g., identification (ID) and password regimes. Other examples may include providing cryptographic authentication and/or evaluation of login ID and other identifying data (e.g., a finger print, an iris scan, etc.). The switch sub-module 13 can shut down the detection sub-module 15 when a control interface of the switch sub-module 13 is accessed. The switch sub-module 13 is also connected to the control module 16.

The network card 14 can connect the computer 10 to a network. The network may be any given network or combination of networks. Examples include, but are not limited to, the Internet, a telephone network, a cable network, a local or wide area network (LAN or WAN), a wireless or wired network, some combination thereof, and so forth. In an exemplary embodiment, the network comprises at least the Internet, and more specifically, the World Wide Web (WWW) portion of the Internet.

The control module 16 can execute a control operation to restrict a system function when a connected network state is detected by the detection module 15. The control operation can include, but is not limited to, shutting down operation, blocking operation, and restricting operation. The shutting down operation terminates an operation system. The blocking operation blocks access to the operation system. The restricting operation restricts usage of a network card.

Figure 2:
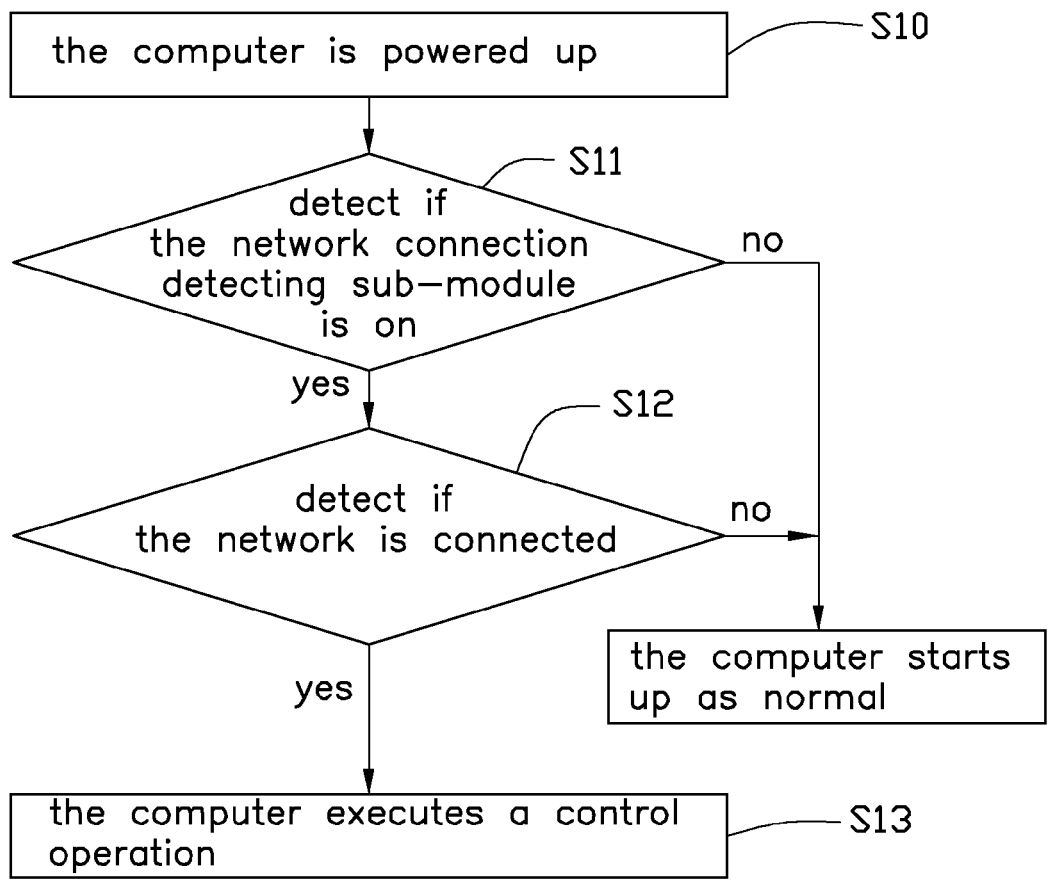
FIG. 2 is flow chart of an embodiment of a method for managing a computer.

FIG. 2 illustrates a flow chart of a method for managing the computer according to one embodiment.

At block S10, the computer 10 is powered up.

At block S11, when the BIOS is booted, it is detected if the detection sub-module 15 is on. If yes, then go to S12. If not, then the computer 10 will start up as normal.

At block S12, the detection sub-module 15 detects if the network is connected.

The switch sub-module 13 may send a control command to the control module 16 when a connected network state is detected, and the computer 10 executes a control operation to restrict a system function by the control module 16 at block S13. If not, the computer 10 starts up as normal.

Figure 3:
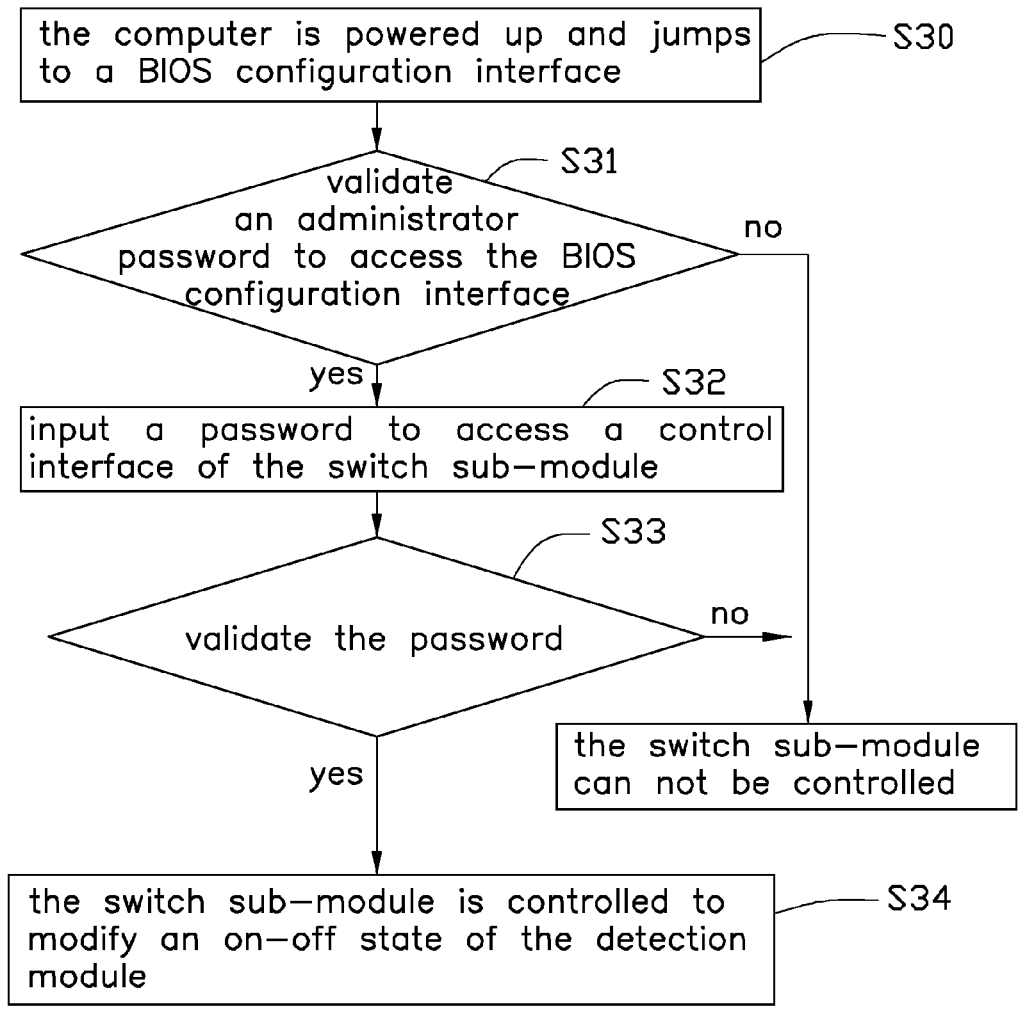
FIG. 3 is a flow chart of an embodiment of a method for controlling the switch sub-module.

FIG. 3 illustrates a flow chart of a method for configuring the switch sub-module 13.

At block S30, the computer 10 is powered up and jumps to a BIOS configuration interface. An administrator password will be allowed if authentication is configured by the BIOS authentication sub-module at block S31

At block S32 and S33, one kind of authentication manner as described above is needed to access a control interface of the switch sub-module 13. The switch sub-module 13 can be controlled to modify an on-off state of the detection module 15 at block S34. If the switch sub-module 13 access is denied, the switch sub-module 13 cannot be controlled.

Depending on the embodiment, certain steps of the methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

It is also to be understood, however, that even though numerous characteristics and advantages have been set forth in the foregoing description of preferred embodiments, together with details of the structures and functions of the preferred embodiments. The disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A method for managing a computer comprising:
   detecting a connected network state of the computer by a detection sub-module when booting a basic input output system (BIOS);
   sending a control command from a switch sub-module to a control module in response to detecting the connected network state; and
   executing a control operation to restrict operation usage of a network card by the control module in response to the control command.

2. The method of claim 1, wherein the detection sub-module detects a physical connection of a network connector of the network card.

3. The method of claim 1, wherein the switch sub-module comprises an authentication sub-module, and the authentication sub-module is capable of approving access to turn off and turn on the detection sub-module.

4. The method of claim 3, wherein the switch sub-module is capable of approving access through a password regime.

5. The method of claim 1, wherein the BIOS storage module further comprises a BIOS authentication sub-module for approving access to amend the BIOS storage module.

6. The method of claim 1, wherein the BIOS storage module is at least one of an electrically erasable programmable read-only memory and a flash memory.

* * * * *